(12) United States Patent
Cao et al.

(10) Patent No.: US 11,762,751 B2
(45) Date of Patent: Sep. 19, 2023

(54) SYSTEM-LEVEL TUNABLE PARAMETER IDENTIFICATION

(71) Applicant: International Business Machines Corporation, Armonk, NY (US)

(72) Inventors: Li Cao, Beijing (CN); Guang Cheng Li, Beijing (CN); Rong Yan, Beijing (CN); Qi Ming Teng, Beijing (CN); Yubo Li, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 16/572,752

(22) Filed: Sep. 17, 2019

(65) Prior Publication Data

US 2021/0081760 A1   Mar. 18, 2021

(51) Int. Cl.
  *G06K 9/00* (2022.01)
  *G06F 11/34* (2006.01)
  *G06N 3/10* (2006.01)
  *G06F 17/15* (2006.01)
  *G06N 3/08* (2023.01)
  *G06F 18/21* (2023.01)
  *G06N 3/045* (2023.01)

(52) U.S. Cl.
  CPC ...... *G06F 11/3409* (2013.01); *G06F 11/3466* (2013.01); *G06F 17/15* (2013.01); *G06F 18/217* (2023.01); *G06N 3/045* (2023.01); *G06N 3/08* (2013.01); *G06N 3/10* (2013.01)

(58) Field of Classification Search
  CPC .......... G06N 3/0454; G06N 3/08; G06N 3/10; G06N 3/0445; G06F 11/3466; G06F 17/15; G06F 2201/81; G06F 11/3409; G06K 9/6262; G06K 9/6271; G06V 10/82
  See application file for complete search history.

(56) References Cited

U.S. PATENT DOCUMENTS

| | | |
|---|---|---|
| 9,800,466 B1 | 10/2017 | Rangole |
| 2018/0341851 A1 | 11/2018 | Chung et al. |
| 2019/0095785 A1 | 3/2019 | Sarkar et al. |
| 2020/0125545 A1* | 4/2020 | Idicula ................. G06N 3/0445 |

(Continued)

OTHER PUBLICATIONS

Anonymous, "Machine-Learning for Optimization of Software Parameters," IP.com No. IPCOM000252023D, Dec. 13, 2017, 35 pgs.

(Continued)

*Primary Examiner* — Andrew M Moyer
(74) *Attorney, Agent, or Firm* — Peter J. Edwards

(57) ABSTRACT

Disclosed are a computer-implemented method, a system, and a computer program product for system-level tunable parameter identification. Performance characteristic data for an application to be tuned can be obtained by one or more processing units. At least one system-level tunable parameter for the application to be tuned can be identified by one or more processing units based on the obtained performance characteristic data for the application to be tuned and a pattern between training performance characteristic data and a set of training system-level parameter-related correlation coefficients. The set of training system-level parameter-related correlation coefficients can be respective correlation coefficients of system-level tunable parameters with respect to at least one performance metric.

20 Claims, 10 Drawing Sheets

(56) References Cited

U.S. PATENT DOCUMENTS

2020/0293835 A1* 9/2020 Doni .................. G06F 11/3409
2020/0401869 A1* 12/2020 Baker .................. G06N 20/20

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

800

810 OBTAIN VALUES OF A FIRST PERFORMANCE METRIC AND VALUES OF A SECOND PERFORMANCE METRIC

820 CALCULATE WEIGHTED SUMS

FIG. 8

SYSTEM-LEVEL TUNABLE PARAMETER IDENTIFICATION

BACKGROUND

The present disclosure relates to parameter processing, and more specifically, to a computer-implemented method, system, and computer program product for system-level tunable parameter identification.

Performance tuning for computing systems and applications is challenging for various well-known reasons. Configuring cross-layer tunable parameters is one of the most critical tasks of performance tuning. Automatic parameter tuning has been a hot research topic in the last several decades, and a number of search and fitting solutions have been proposed to automate the parameters tuning.

SUMMARY

According to some embodiments of the present disclosure, there is provided a computer-implemented method for system-level tunable parameter identification. In this method, performance characteristic data for an application to be tuned can be obtained by one or more processing units. At least one system-level tunable parameter for the application to be tuned can be identified by one or more processing units based on the obtained performance characteristic data for the application to be tuned and a pattern between training performance characteristic data and a set of training system-level parameter-related correlation coefficients. The set of training system-level parameter-related correlation coefficients can comprise respective correlation coefficients of system-level tunable parameters with respect to at least one performance metric.

According to another embodiment of the present disclosure, there is provided a system for system-level tunable parameter identification. The system comprises one or more processors, a memory coupled to at least one of the processors and a set of computer program instructions stored in the memory. When executed by at least one of the processors, the set of computer program instructions perform following actions. Performance characteristic data for an application to be tuned can be obtained. At least one system-level tunable parameter for the application to be tuned can be identified based on the obtained performance characteristic data for the application to be tuned and a pattern between training performance characteristic data and a set of training system-level parameter-related correlation coefficients. The set of training system-level parameter-related correlation coefficients can comprise respective correlation coefficients of system-level tunable parameters with respect to at least one performance metric.

According to a yet another embodiment of the present disclosure, there is provided computer program product for system-level tunable parameter identification. The computer program product comprises a computer readable storage medium having program instructions embodied therewith. The program instructions are executable by a processor to cause the processor to perform following actions. Performance characteristic data for an application to be tuned can be obtained. At least one system-level tunable parameter for the application to be tuned can be identified based on the obtained performance characteristic data for the application to be tuned and a pattern between training performance characteristic data and a set of training system-level parameter-related correlation coefficients. The set of training system-level parameter-related correlation coefficients can comprise respective correlation coefficients of system-level tunable parameters with respect to at least one performance metric.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 8 depicts exemplary detailed procedures of method 600 according to some embodiments of the present disclosure.

Figure 1:
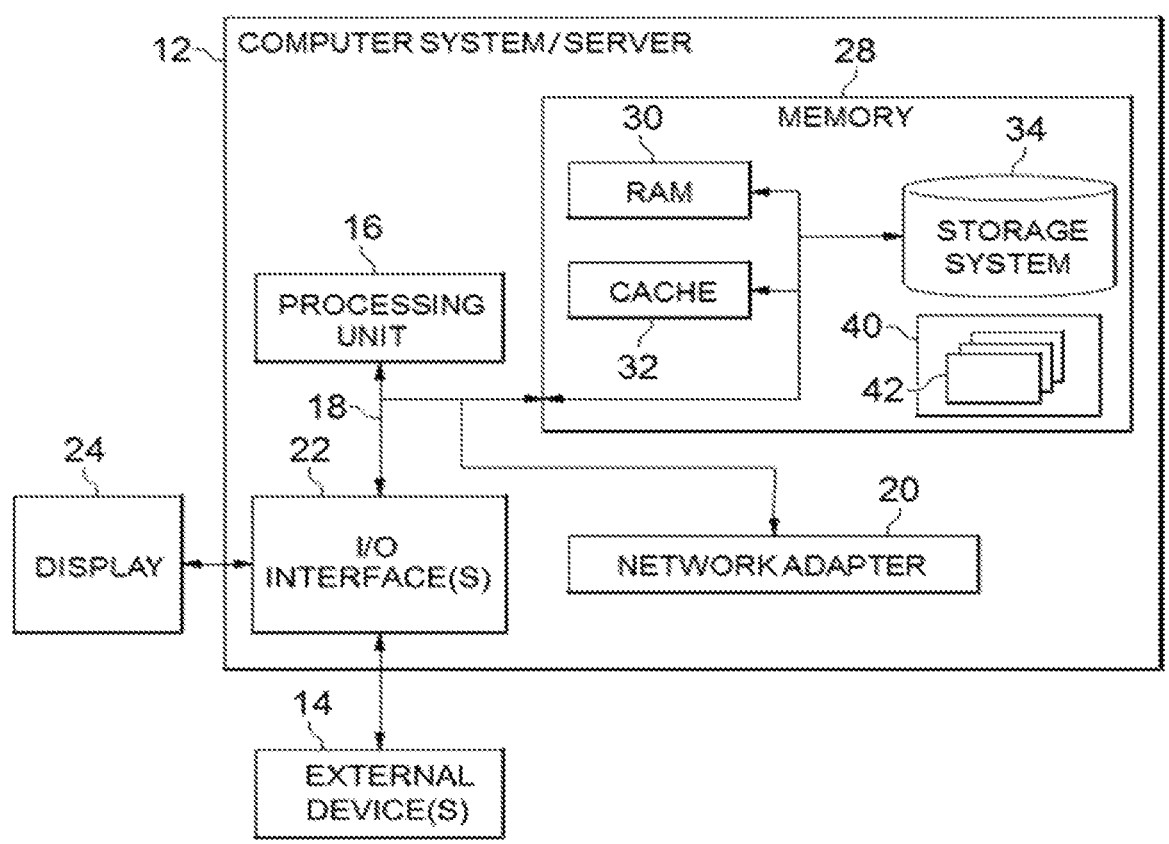
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present disclosure described herein. Regardless, cloud computing node 10 is capable of being implemented and/or performing any of the functionality set forth herein.

In cloud computing node 10 there is a computer system/server 12, which in some embodiments can be a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, etc. and a display 24; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
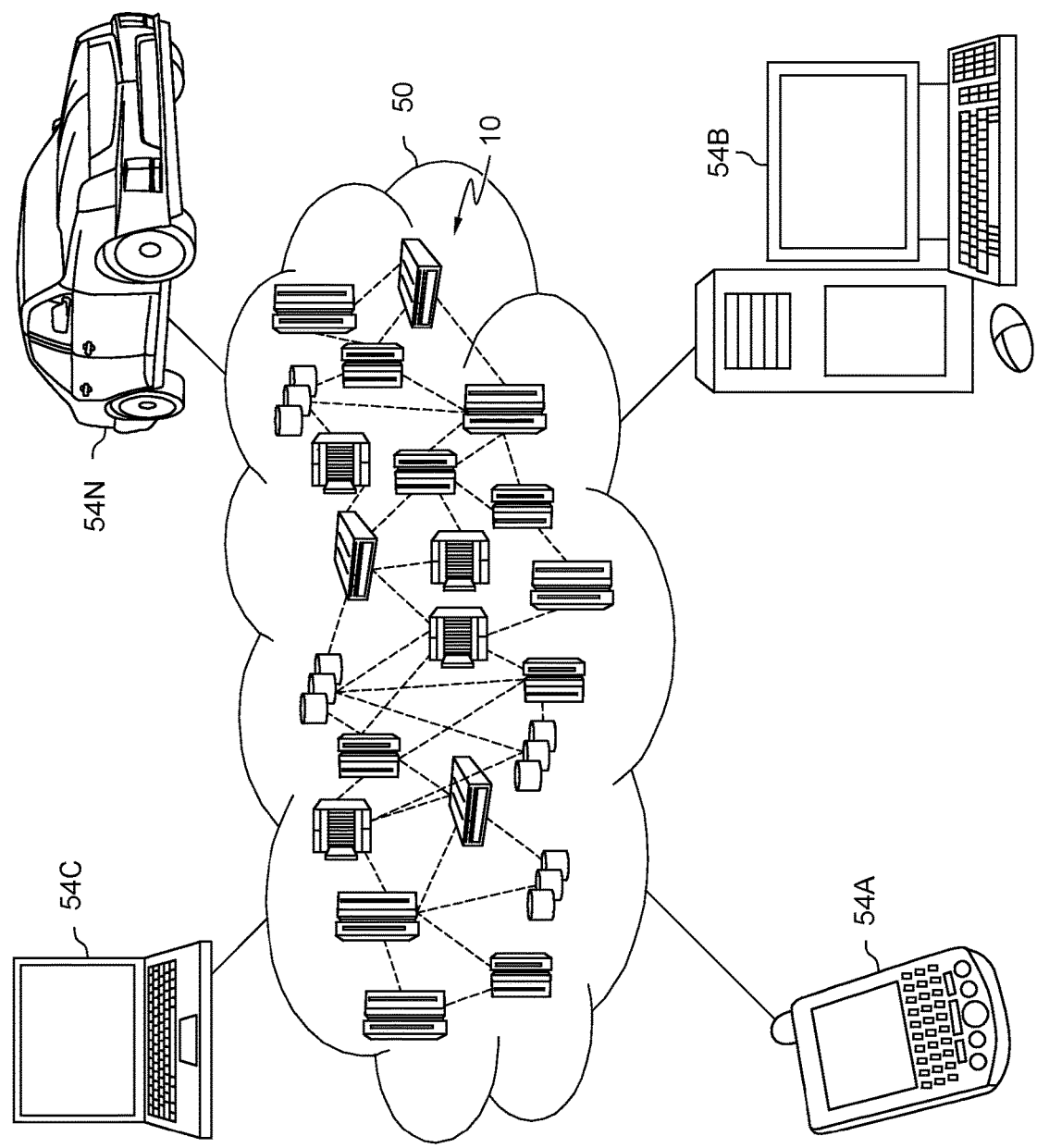
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
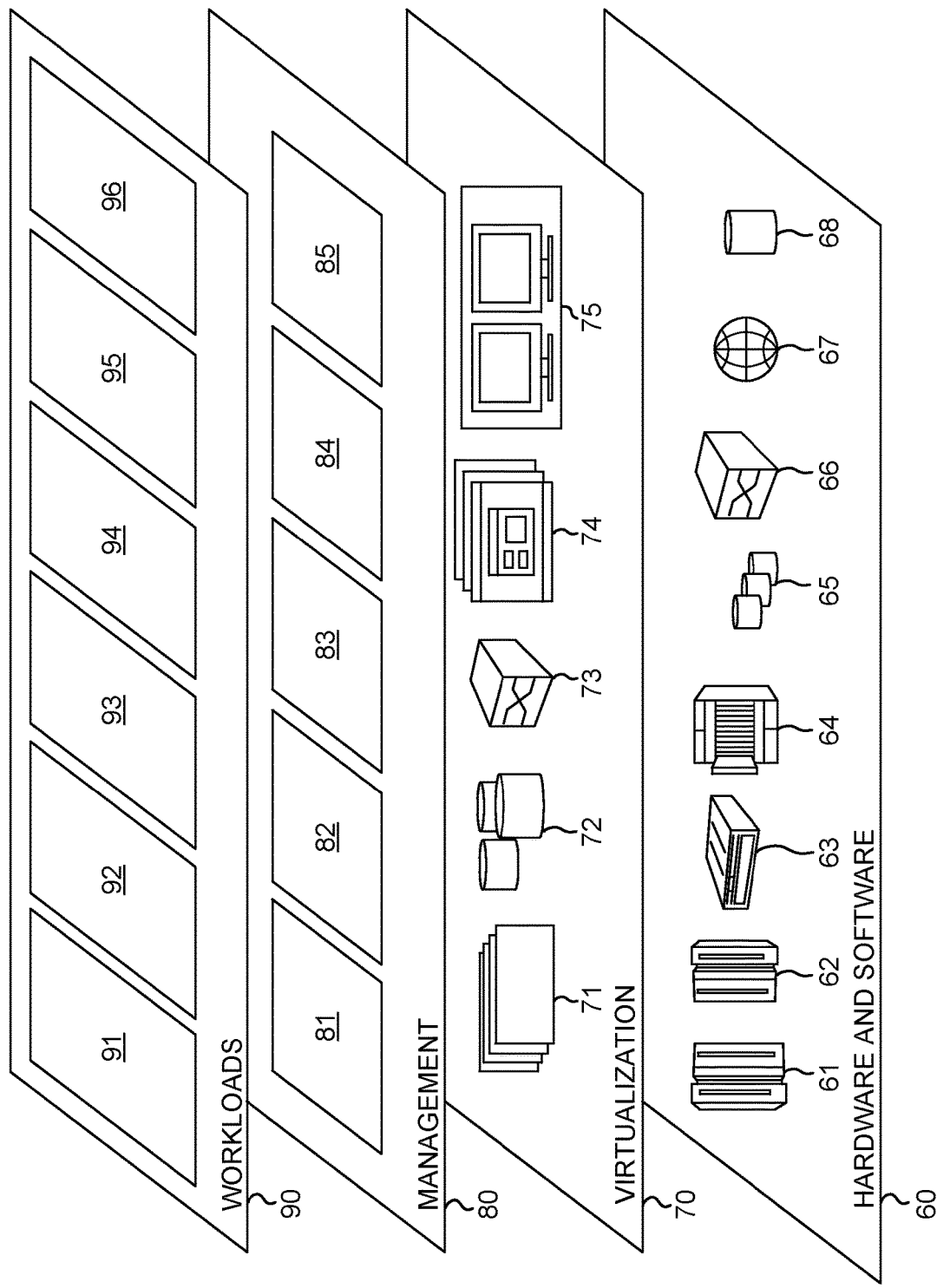
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system-level tunable parameter identification 96.

The functional abstraction layers in FIG. 3 are only for example. When necessary, one or more layers can be added thereto, and one or more layers in FIG. 3 can be merged or omitted. In addition, in each layer of FIG. 3, some components can be omitted or merged, and one or more components can be added.

As discussed above, automatic parameter tuning has been a hot research topic in the last several decades. With the recent AI (artificial intelligence) development since the early 2010s, it is realized that some machine learning and deep learning techniques can also be excellent tools for automatic parameter tuning. However, none of these existing automatic tuning technologies covers tunable parameter identification. Currently, users wishing to use automatic tuning have to manually identify and specify the tunable parameters and feed these tunable parameters to autotuning tools. Different from application-level tunable parameters, system-level tunable parameters are commonly applied for different applications. However, selecting effective system-level tunable parameters, the system-level tunable parameters that have more influence on application performance than other system-level tunable parameters, from all of system-level tunable parameters (for example, more than 2000 Linux kernel parameters and more than 200 Java Virtual Machine (JVM) tunable parameters) is still challenging. Identifying the tunable parameters can be difficult, slow, and costly. Although the number of effective system-level tunable parameters is usually small, for example, 5-10 parameters, the effective system-level tunable parameters for different applications are different. A set of effective system-level tunable parameters for one application cannot be simply applied to another application. In addition, using a completed list of all system-level tunable parameters (for example, more than 2000 Linux kernel parameters) blindly for performance tuning is not practical, as it may lead to slow tuning in the follow-up process of choosing values for parameters to optimize the performance of an application. Therefore, identification of effective tunable parameters, especially effective system-level tunable parameters, is an important task.

Embodiments of the present disclosure aim to solve at least one of the technical problems described above, and propose a method, system and computer program product for identifying at least one system-level tunable parameter from all of system-level tunable parameters, as at least one effective system-level tunable parameter for an application to be tuned automatically, which can save labor work and improve efficiency.

Figure 4:
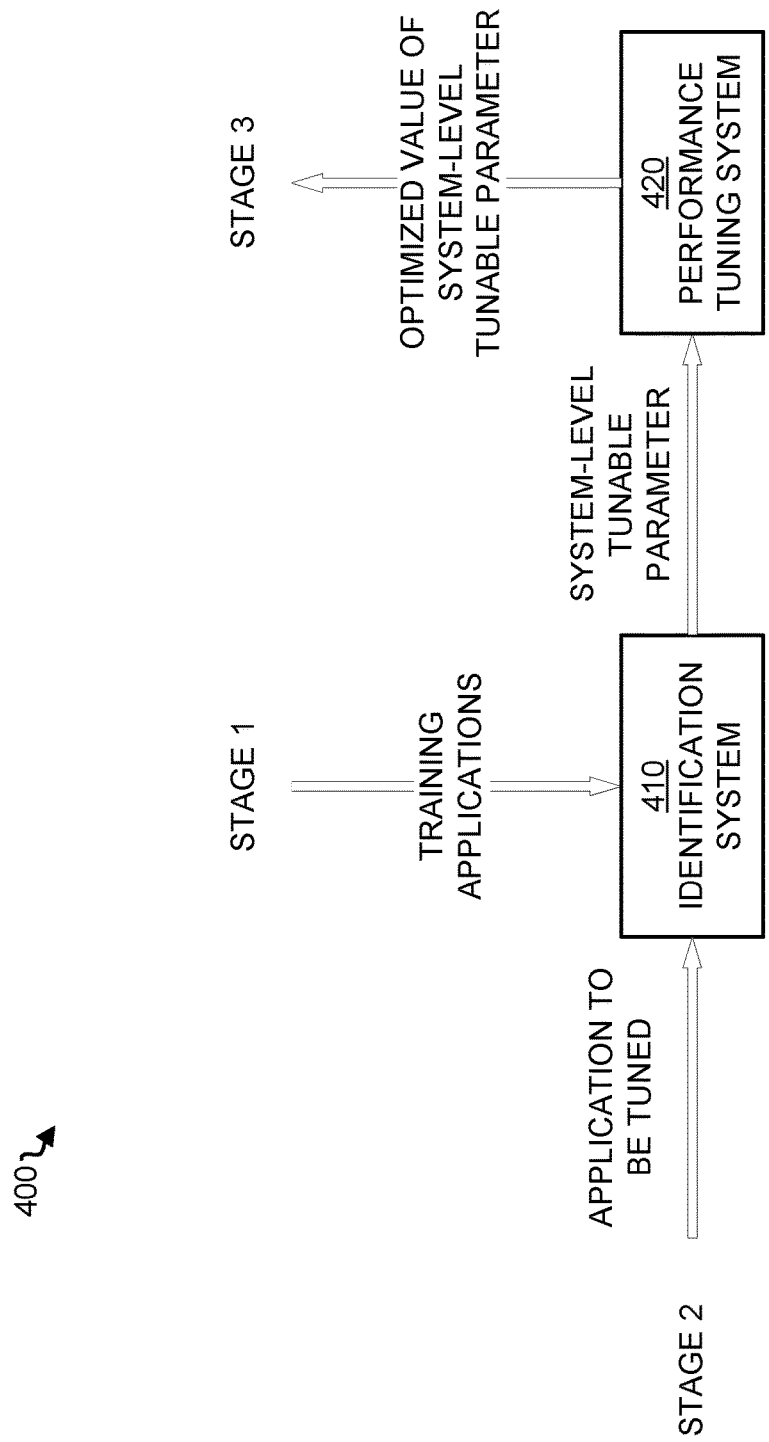
FIG. 4 depicts a schematic diagram of a scenario 400 to which some embodiments of the present disclosure can be applied.

Referring now to FIG. 4, shown is a schematic diagram of a scenario 400 to which some embodiments of the present disclosure can be applied. As can be seen in FIG. 4, scenario 400 relates to the whole process of performance tuning. In stage 1, data relating to at least one training application, including training performance characteristic data and a set of training system-level parameter-related correlation coefficients for each of the training application(s), is inputted into an identification system 410 according to some embodiments of the present disclosure so as to train the identification system 410. Identification system 410 can generate a pattern based on the inputted training performance characteristic data and training system-level parameter-related correlation coefficients. For each of the training application(s), the training performance characteristic data may include data relating to various performance characteristics. A performance characteristic herein refers to system resource usage, such as CPU usage, memory usage, number of threads or the like. Each correlation coefficient in the set of training system-level parameter-related correlation coefficients for an application is a correlation coefficient of a system-level tunable parameter with respect to at least one performance metric of the application, and the performance metric herein refers to measurement of service providing capability of an application, such as QPS (Query Per Second), latency, or the like.

In stage 2, data relating to an application to be tuned, including performance characteristic data for the application to be tuned, is inputted into the identification system 410. The identification system 410 outputs at least one system-level tunable parameter, which can be used as at least one effective system-level tunable parameter for the application to be tuned, based on the pattern and the inputted performance characteristic data for the application to be tuned, to a performance tuning system 420, which in turn performs automatic parameter tuning to obtain optimized values of the at least one system-level tunable parameter in stage 3.

It can be seen that the identification system 410 according to some embodiments of the present disclosure plays an important role in the whole process of performance tuning, as it can automatically identify, from for example all system-level tunable parameters, effective system-level tunable parameters, which allows performance tuning users to avoid tough manual identification and improves the efficiency of the whole process.

It should be noted that the identification system 410 according to some embodiments of the present disclosure could be implemented by computer system/server 12 or processing unit 16 of FIG. 1, and the performance tuning system 420 could be implemented by adopting any known techniques for automatic parameter tuning. Embodiments of the present disclosure focus on implementations of various functions (including stage 1 and stage 2) of the identification system 410, which can be used in the process of performance tuning in various fields, such as software, system, data center, cloud, operating system, distributed application, hardware, parallel file system, and so on.

As used herein, the term "system-level tunable parameters" indicates the tunable parameters related to the system (including middleware), and independent of the type of the application running on the system. System-level tunable parameters include but are not limited to: hardware/firmware setting parameters (e.g., hardware prefetch level for POWER processors), operating system parameters (e.g., Linux kernel parameters) and middleware parameters (e.g., JVM parameters for Java® applications). As used herein, the term "effective system-level tunable parameters" indicates the system-level tunable parameters that have more influence on application performance than other system-level tunable parameters, which can be determined for example by comparing the influence of a system-level tunable parameter on the application performance with a threshold value and/or by comparison to other system-level tunable parameters (e.g., the top 10% of parameters in terms of influence may be deemed "effective").

Figure 5:
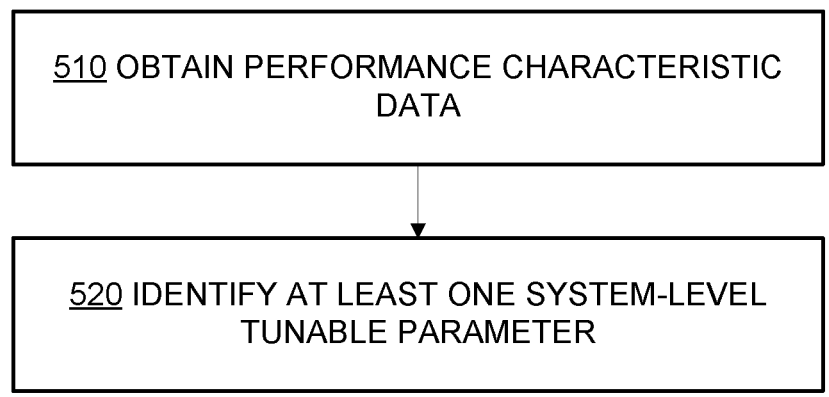
FIG. 5 depicts a flowchart of a method 500 for system-level tunable parameter identification according to some embodiments of the present disclosure.

Referring now to FIG. 5, shown is a flowchart of a method 500 for system-level tunable parameter identification according to some embodiments of the present disclosure. The method 500 can be implemented by one or more processing units, for example, implemented by computer system/server 12 or processing unit 16 of FIG. 1. At operation 510, performance characteristic data for an application to be tuned can be obtained. At operation 520, at least one system-level tunable parameter for the application to be tuned can be identified based on the obtained performance characteristic data for the application to be tuned, a pattern between training performance characteristic data, and a set of training system-level parameter-related correlation coefficients. The set of training system-level parameter-related correlation coefficients can comprise respective correlation coefficients of system-level tunable parameters with respect to at least one performance metric. The identified at least one system-level tunable parameter can be used as at least one effective system-level tunable parameter.

According to some embodiments related to FIG. 5, the system-level tunable parameter identification for an application to be tuned can be implemented based on a pattern determined by AI technology with training applications. It is noted that the pattern used in FIG. 5 can be one that has been trained before the start of the process of FIG. 5, and the process of some embodiments according to FIG. 5 does not necessarily comprise the operations of training themselves. However, some embodiments of the present disclosure can comprise the operations of training, as shown in FIG. 6.

Figure 6:
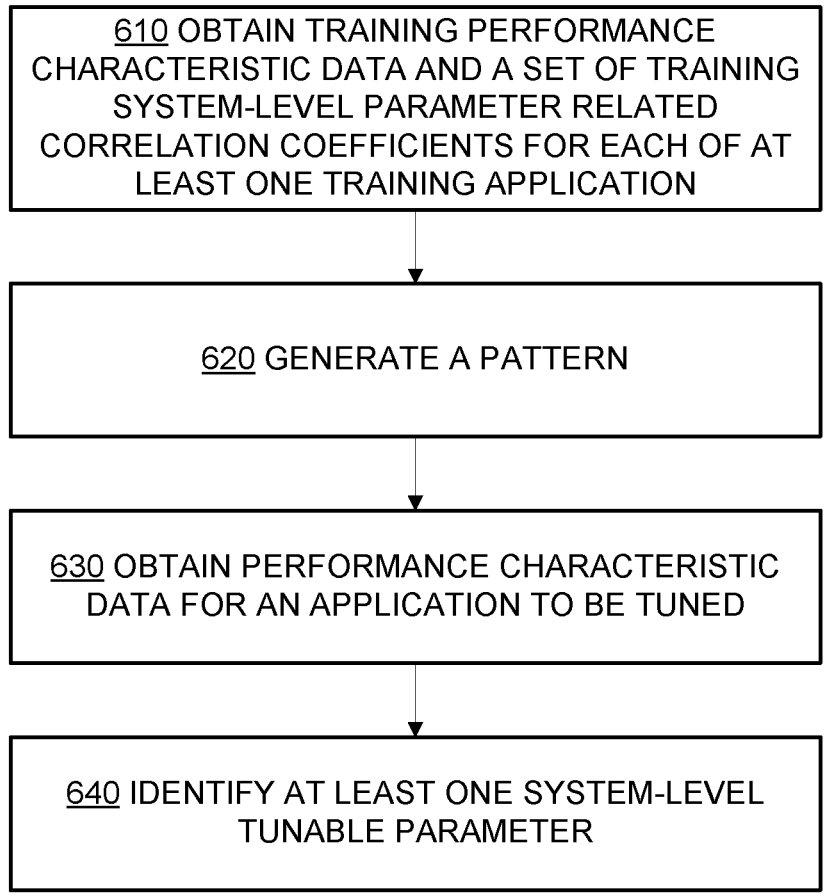
FIG. 6 depicts a flowchart of a method 600 for system-level tunable parameter identification according to some embodiments of the present disclosure.

Referring now to FIG. 6, depicted is a flowchart of a method 600 for system-level tunable parameter identification according to some embodiments of the present disclosure. The method 600 can be implemented by one or more processing units, for example, implemented by computer system/server 12 or processing unit 16 of FIG. 1. Operations 630 and 640 of FIG. 6 can correspond to operations 510 and 520 of FIG. 5 respectively, and thus the difference between the methods 600 and 500 is that method 600 further comprises operations 610 and 620. Operations 610 and 620 comprise operations for training the pattern between the training performance characteristic data and the set of training system-level parameter-related correlation coefficients. At operation 610, training performance characteristic data and a set of training system-level parameter-related correlation coefficients for each of at least one training application can be obtained. At operation 620, the pattern can be generated based on the obtained training performance characteristic data and training system-level parameter-related correlation coefficients for the at least one training application. Operations 630 and 640 relate to identifying at least one system-level tunable parameter for the application to be tuned based on the trained pattern, which correspond to operations 510 and 520 of FIG. 5 respectively.

Details will now be described based on FIG. 6 in the following, and the description can also be applied to corresponding parts of FIG. 5 unless otherwise indicated.

At operation 610, training performance characteristic data for each of at least one training application can be obtained. The training performance characteristic data can include a respective value of at least one performance characteristic for an application and can, for example, take a form of a vector, which can be referred to as a performance characteristic vector herein. The number of performance characteristics in the performance characteristic vector can be predetermined arbitrarily and/or according to actual needs. For example, the performance characteristics of an application can include CPU usage, memory usage, swap usage, disk read IOPS (Input/output Operations Per Second), etc. Known benchmarking tools such as Apache Bench (AB) can be used to stress test an application to get values of corresponding performance characteristics, which are outputted as a performance characteristic vector through APIs such as proc file system or nmon (Nigel's Monitor). The proc file system is a file system in Unix-like operating systems that presents information about processes and other system information in a hierarchical file-like structure. The nmon is a computer performance system monitor tool for the AIX and Linux operating systems. In other embodiments, different file systems and/or monitor tools can be used.

Column 1 of Table 1 below shows a non-limiting example of values of a plurality of performance characteristics, column 2 of Table 1 provides descriptions of corresponding performance characteristics, and column 3 of Table 1 shows the source from which the values of column 1 can be obtained.

TABLE 1

| Vector Values | Description | Source |
| --- | --- | --- |
| 0.38 | CPU usage(%) | /proc/stat |
| 0.98 | Memory usage(%) | /proc/meminfo |
| 0.42 | Swap usage(%) | /proc/meminfo, proc/swaps |
| 273 | Disk Read IOPS | /proc/diskstats |
| 168 | Disk Write IOPS | /proc/diskstats |
| 35.2 | Disk Read I/O(MB/s) | /proc/diskstats |
| 2847.6 | Disk Write I/O(MB/s) | /proc/diskstats |
| 174 | Number of Processes | /proc/<pids> |
| 872 | Number of threads | /proc/<pids>/task/<taskid>/stat |
| 637 | Opened files | /proc/<pids>/fd |
| 3481 | Network connections | /proc/net/{tcp4, tcp6, udp4, udp6, unix} |
| 13.4 | Network outbound traffic(%) | /proc/net/dev |
| 38.5 | Network inbound traffic(%) | /proc/net/dev |
| ... | ... | ... |

Therefore, the obtained training performance characteristic data can be represented as vector V1, which can be processed as described below to yield vector V2.

$$V1 = \begin{bmatrix} 0.38 \\ 0.98 \\ 0.42 \\ 273 \\ 168 \\ 35.2 \\ 2847.6 \\ 174 \\ 872 \\ 637 \\ 3481 \\ 13.4 \\ 38.5 \\ \vdots \end{bmatrix} \quad V2 = \begin{bmatrix} 1 \\ 0 \\ 0 \\ 0 \\ 0 \\ 0 \\ 0 \\ 0 \\ 0 \\ 0 \\ 0 \\ 0 \\ 0 \\ \vdots \end{bmatrix}$$

In some embodiments, vector V1 can be further processed to be as the training performance characteristic data or vector defined herein. For example, vector V1 an be normalized for each value to generate a normalized vector. For example, each value can be compared with a corresponding threshold, and if the value is larger than the threshold, the value is normalized to be "1", otherwise, the value is normalized to be "0". With normalization, small changes of the values of performance characteristics in the process of obtaining training performance characteristic data and the training system-level parameter-related correlation coefficients can be omitted. As an example, vector V2 can be generated as the training performance characteristic data.

In vector V2, only the first value is "1", while the other values are all "0". If the first value represents CPU usage, vector V2 can indicate the application is a CPU intensive application.

At operation 610, a set of training system-level parameter-related correlation coefficients for each of at least one training application can also be obtained. The set of training system-level parameter-related correlation coefficients can include respective correlation coefficients of system-level tunable parameters with respect to at least one performance metric and can, for example, take a form of a vector, which can be referred to as a correlation vector herein. In an example, the correlation vector may include correlation coefficients of all system-level tunable parameters. That is, if the number of all system-level tunable parameters is 2000, the correlation vector will include 2000 correlation coefficients corresponding to the 2000 system-level tunable parameters respectively. For example, the correlation vector could include all Linux kernel parameters or all JVM tunable parameters. The number of coefficients in the correlation vector can be predetermined arbitrarily and/or according to actual needs. For example, the correlation vector may only include correlation coefficients of part of all system-level tunable parameters.

The performance metric herein refers to measurement of service providing capability of an application, such as QPS (Query Per Second) or latency. For example, for a CPU intensive application, the performance metric can be the number of processes which can be processed by the CPU. For another example, for a web server application, the performance metric can be the number of requests processed per second (for example, QPS), or the performance metric may be the latency of a packet. Which performance metric(s) are selected to calculate the correlation coefficients for a training application can be determined by the user according to actual needs or according to predetermined mapping between the type of the training applications and related metric(s).

Table 2 below shows a list of system-level tunable parameters (column 1) and their corresponding correlation coefficients.

TABLE 2

| Parameter | Correlation coefficient |
|---|---|
| Para-1 | 0.7 |
| Para-2 | 0.0003 |
| Para-3 | −0.3 |
| ... | ... |
| Para-n | 0.9 |

Positive values in column 2 above means positive correlation between the tunable parameters and the performance metric, negative values in column 2 above means negative correlation between the tunable parameters and the performance metric. For example, if when a parameter changes from a small value to a large value, the performance metric also changes from a small value to a large value as well, or vice versa, then there is positive correlation between the parameter and the performance metric. In contrast, if when a parameter changes from a small value to a large value, the performance metric changes from a large value to a small value, or vice versa, then there is negative correlation between the parameter and the performance metric. Value of zero means the tunable parameter has no influence on the performance metric.

For example, correlation vector V3 including all the values in column 2 above can be considered as a set of training system-level parameter-related correlation coefficients:

$$V3 = \begin{bmatrix} 0.7 \\ 0.0003 \\ -0.3 \\ \vdots \\ 0.9 \end{bmatrix}.$$

Figure 7:
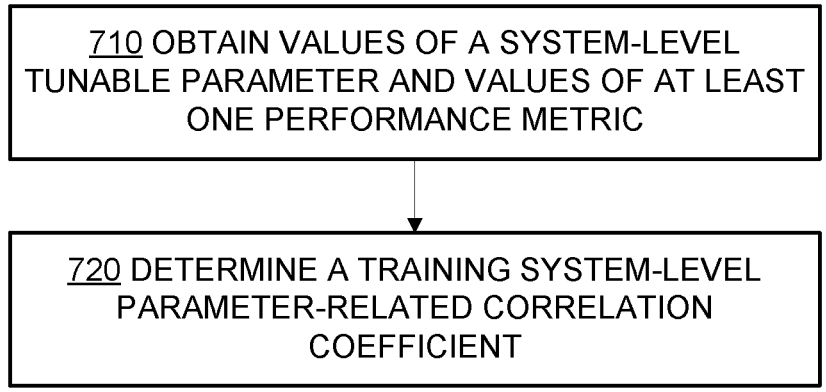
FIG. 7 depicts exemplary detailed procedures of method 600 according to some embodiments of the present disclosure.

After the performance metric is determined, a set of training system-level parameter-related correlation coefficients for a training application can be determined. The correlation coefficient reflects changing relationship between values of the performance metric(s) and values of the system-level tunable parameter. FIG. 7 shows some embodiments of how to determine the set of training system-level parameter-related correlation coefficients (in this example, a correlation vector). At operation 710, values of a system-level tunable parameter (e.g., Para-1, Para-2, or Para-n in Table 2) within a valid range and corresponding values of at least one performance metric of each of the at least one training application can be obtained. At operation 720, a training system-level parameter-related correlation coefficient related to the system-level tunable parameter for each of the at least one training application can be determined based on the changing relationship between the corresponding values of the at least one performance metric and the values of the system-level tunable parameter within the valid range. The above operations 710-720 can be performed for every system-level tunable parameter in the predetermined list of system-level tunable parameters to determine the set of training system-level parameter-related correlation coefficients for each of the at least one training application.

Next, a specific example will be described for the above operations 710-720. It should be noted that this example is only exemplary and used to facilitate understanding embodiments of the present disclosure, but not in any way limiting the scope thereof; other implementations can also be used. In this specific example, it is assumed that the training application is a web server application and the performance metric to be considered is QPS. Firstly, values of a specific system-level tunable parameter within a valid range thereof can be obtained, for example, values of Para-1 within its valid range of 1-99 can be obtained. Also, corresponding values of the QPS can be obtained. After that, a training correlation coefficient related to Para-1 can be determined based on changing relationship between the corresponding values of the QPS and the values of Para-1. Any fitting method can be applied to these values to calculate the training correlation coefficient. In some embodiments, a linear fitting method such as least squares can be used. The changing relationship between the corresponding values of the QPS and the values of Para-1 is assumed to conform to the following equation 1.

$$Y = AX + B \tag{1}$$

Note that the ratio of change of performance metric and the ratio of change of system-level tunable parameter, i.e., the absolute change divided by the original value, are used herein to calculate the training correlation coefficient. Thus, the independent variable X in equation 1 refers to the ratio of change of system-level tunable parameter (Para-1), the dependent variable Y in equation 1 refers to the ratio of change of performance metric (QPS), and parameter A indicates the training correlation coefficient related to the system-level tunable parameter (Para-1).

In an example, a number N of values of Para-1 and corresponding values of QPS can be used to determine the parameter A in equation 1. For example, N=5 values of Para-1 (X1, X2, X3, X4, X5) and corresponding 5 values of QPS (Y1, Y2, Y3, Y4, Y5) can be used, and the ratio of change of Para-1 and the ratio of change of QPS are calculated as N−1=4 pairs of values of $$\left(\frac{X2-X1}{X1}, \frac{Y2-Y1}{Y1}\right), \left(\frac{X3-X1}{X1}, \frac{Y3-Y1}{Y1}\right),$$
$$\left(\frac{X4-X1}{X1}, \frac{Y4-Y1}{Y1}\right) \text{ and } \left(\frac{X5-X1}{X1}, \frac{Y5-Y1}{Y1}\right),$$

using the first obtained values of X1 and Y1 as original values. These 4 pairs of values are further used to determine value of the parameter A in equation 1 as the training correlation coefficient related to Para-1.

In another example, in order to get a better result of the training correlation coefficient, a tolerance threshold C is used to determine whether the determined training correlation coefficient (value of the parameter A in equation 1) is acceptable. That is, a first number N1 of values of Para-1 and corresponding values of QPS can be used to determine a first value, A1, of the parameter A, a second number, N2, of values of Para-1 and corresponding values of QPS can be used to determine a second value, A2, of the parameter A. If the difference between A1 and A2 is smaller than or equal to the tolerance threshold C, then A1, A2, or the average of A1 and A2 is determined to be the training system-level parameter-related correlation coefficient for Para-1 with respect to QPS. Otherwise, if the difference between A1 and A2 is larger than the tolerance threshold C, then a third number N3 of values of Para-1 and corresponding values of QPS can be used to determine a third value A3 of the parameter A, and the difference between A3 and A2 is calculated. The above procedures are repeated until the difference between two newest values of the parameter A is smaller than or equal to the tolerance threshold C, and one or the average of the two newest values of A is determined to be the training system-level parameter-related correlation coefficient for Para-1 with respect to QPS. Known benchmarking tools such as Apache Bench (AB) can be used to get values of the performance metric, which are outputted through APIs such as proc file system or nmon.

In some embodiments, the set of training system-level parameter-related correlation coefficients for a training application can be normalized as the final set of training system-level parameter-related correlation coefficients. For example, the normalization can be done using the following equation 2.

$$A_{norm} = \pm \left(\frac{(|A|-|A|_{min}())}{(|A|\min_{max})()}\right) \quad (2)$$

Wherein, $A_{norm}$ indicates the normalized value of correlation coefficient A to be normalized, $|A|_{min}$ indicates the minimum of absolute values of all the correlation coefficients before normalization, and $|A|_{max}$ indicates the maximum of absolute values of all the correlation coefficients before normalization. If A is a positive value, the sign in equation 2 will take a positive sign; otherwise, it will take a negative sign.

It is noted that one or more performance metrics can be used to determine training correlation coefficients. FIG. 8 shows some embodiments in which multiple performance metrics are used. As shown in FIG. 8, the obtaining corresponding values of at least one performance metric of each of the at least one training application at operation 710 of FIG. 7 can include operations 810-820. At operation 810, values of a first performance metric and values of a second performance metric corresponding to the values of the system-level tunable parameter within the valid range respectively can be obtained. At operation 820, weighted sums of the values of the first performance metric and the values of the second performance metric can be calculated. The weighing factor for respective performance metric can be predetermined according to actual needs.

Next, a specific example will be described to explain the above operations 810-820. It should be noted that this example is only exemplary and used to facilitate understanding embodiments of the present disclosure, but not in any way limiting the scope thereof; other implementations can also be used. In this specific example, it is assumed that the training application is a web server application and the performance metrics to be considered are QPS and packet latency. Firstly, values of a specific system-level tunable parameter within a valid range thereof can be obtained, for example, values of Para-1 within its valid range of 1-99 can be obtained. Also, corresponding values of the QPS (first performance metric) and values of the packet latency (second performance metric) can be obtained. For example, assuming the QPS and the packet latency corresponding to a first value, P1, of Para-1 within its valid range is Q1 and L1 respectively, the QPS and the packet latency corresponding to a second value, P2, of Para-1 within its valid range is Q2 and L2 respectively, and the weighting factors for the QPS (first performance metric) and packet latency (second performance metric) are W1 and W2 respectively, then the first value M1 of the performance metric corresponding to P1 is calculated as M1=W1*Q1+W2*L1, and the second value M2 of the performance metric corresponding to P2 is calculated as M2=W1*Q2+W2*L2. For example, assuming that Q1=10000, Q2=20000, L1=2 ms, L2=4 ms, W1=1 and W2=−1000, then M1=W1*Q1+W2*L1=8000, and M2=W1*Q2+W2*L2=16000. In this way, values of different performance metrics can be converted into values of one unified performance metric.

In order to get a better training result, the at least one training application can comprise a plurality of training applications. In this case, obtaining a set of training system-level parameter-related correlation coefficients (for example, a correlation vector) for each of at least one training application at operation 610 includes obtaining a correlation vector for each of the plurality of training applications. Therefore, the obtained sets of training system-level parameter-related correlation coefficients for the plurality of training applications can include a plurality of correlation vectors respectively corresponding to the plurality of training applications (and thus, the plurality of performance characteristic vectors). In some embodiments, a training application can be written or selected by the user based on some basic rules. As a non-limiting example, one basic rule may be that a written or selected application should be representative of a specific performance characteristic. For example, the written or selected application may be CPU intensive, memory intensive, disk I/O intensive, or network intensive, etc. As another non-limiting example, one basic rule may be that the written or selected application should be of low cost, that is, the cost for obtaining the training performance characteristic data and the training system-level parameter-related correlation coefficients should be relatively low. Writing or selecting an application with low cost as a training application can speed up the training process. In other words, the at least one training application can be selected based on at least one of (i) representativeness of a specific performance characteristic and (ii) cost for obtaining training performance characteristic data and training system-level parameter-related correlation coefficients for the at least one training application. In some embodiments, the at least one training application may comprise a first training application and a second training application, where the first training application is representative of a first performance characteristic, and the second training application is representative of a second performance characteristic different from the first performance characteristic. For example, a first application among the plurality of training applications may be CPU intensive, a second application may be memory intensive, a third application may be disk I/O intensive, etc., so as to make the set of training applications as diverse as possible and be representative of various characteristics.

Referring now back to FIG. 6, at operation 620, a pattern (relationship between the training performance characteristic data and the training system-level parameter-related correlation coefficients) can be generated based on the obtained training performance characteristic data and training system-level parameter-related correlation coefficients for the at least one training application. In a case that the at least one training application comprises a plurality of training applications, the training performance characteristic data and the training system-level parameter-related correlation coefficients can include, for example, a plurality of pairs of performance characteristic vectors and correlation vectors, with each pair of performance characteristic vector and correlation vector corresponding to one training application, and thus the pattern can be generated based on the plurality of pairs of performance characteristic vectors and correlation vectors.

Any type of artificial neural network can be used at operation 620 to generate the pattern which represents mapping or relationship between the training performance characteristic data and the set of training system-level parameter-related correlation coefficients. Known artificial neural networks such as convolutional neural network (CNN), recursive neural network, and so on can be used. As known by those of skill in the art, an artificial neural network can be trained based on training data (including training inputs and corresponding training outputs) to generate a pattern between the training inputs and outputs, and then used to infer an output based on an input and the generated pattern. In embodiments of the present disclosure, an artificial neural network is trained using the training performance characteristic data (training inputs) and the sets of training system-level parameter-related correlation coefficients (corresponding training outputs) at operation 620, and further used to identify at least one system-level tunable parameter for the application to be tuned at operation 640. In some embodiments, a set of system-level parameter-related correlation coefficients for the application to be tuned can be determined based on the obtained performance characteristic data for the application to be tuned and the pattern, and the determined set of system-level parameter-related correlation coefficients can be further used to identify the at least one system-level tunable parameter. In some embodiments, the determined set of system-level parameter-related correlation coefficients for the application to be tuned can be further processed based on actual tuning results in the follow-up process of performance tuning. For example, 5 system-level tunable parameters are identified as the at least one system-level tunable parameter (effective system-level tunable parameters). The user can determine that 3 out of the 5 system-level tunable parameters are the actual effective system-level tunable parameters for the application to be tuned based on actual tuning result in the follow-up process of performance tuning, then correlation coefficients corresponding to the 3 system-level tunable parameters in the determined set of system-level parameter-related correlation coefficients for the application to be tuned can be maintained while correlation coefficients corresponding to the other system-level tunable parameters can be processed to be zero, so as to obtain a processed set of system-level parameter-related correlation coefficients for the application to be tuned. The performance characteristic data and processed set of system-level parameter-related correlation coefficients for the application to be tuned can be further used as training inputs and outputs to the artificial neural network respectively, so as to improve the generated pattern.

In some embodiments, in order to get a better result for the identification of system-level tunable parameters for an application to be tuned, several types of artificial neural networks can be used to generate several patterns (i.e., sub-patterns) accordingly, and these sub-patterns can in turn be used at operation 640 to identify at least one system-level tunable parameter for the application to be tuned. Thus, in some embodiments, the pattern between training performance characteristic data and a set of training system-level parameter-related correlation coefficients is generated from a first sub-pattern and a second sub-pattern. The first sub-pattern is generated in accordance with a first type of artificial neural network based on the at least one training application; and the second sub-pattern is generated in accordance with a second type of artificial neural network different from the first type of artificial neural network based on the at least one training application. For example, the first sub-pattern can be used to determine a first set of training system-level parameter-related correlation coefficients for the application to be tuned, and the second sub-pattern can be used to determine a second set of training system-level parameter-related correlation coefficients for the application to be tuned. Then a weighted sum of the first and second sets of training system-level parameter-related correlation coefficients can be used to identify the at least one system-level tunable parameter for the application to be tuned at operation 640.

After the artificial neural network is trained, i.e., the pattern is generated, the artificial neural network can be used for system-level tunable parameter identification. At operation 630, performance characteristic data for an application to be tuned can be obtained to be input to a trained artificial neural network to infer the output. The procedure of obtaining the performance characteristic data for the application to be tuned can be the same as the procedure of obtaining training performance characteristic data for a training application described according to operation 610, and the obtained performance characteristic data (performance characteristic vector) for the application to be tuned may take the form of vector which is the same as the performance characteristic vector V1 or V2. Details are omitted herein for conciseness. An example of performance characteristic data for an application to be tuned, which is referred to as a target performance characteristic vector herein, is shown as $$V4 = \begin{bmatrix} 3 \\ 5 \\ 0.2 \\ 100 \\ 800 \\ 0 \\ 0 \\ 50 \\ \vdots \\ 200 \end{bmatrix}.$$

Figure 9:
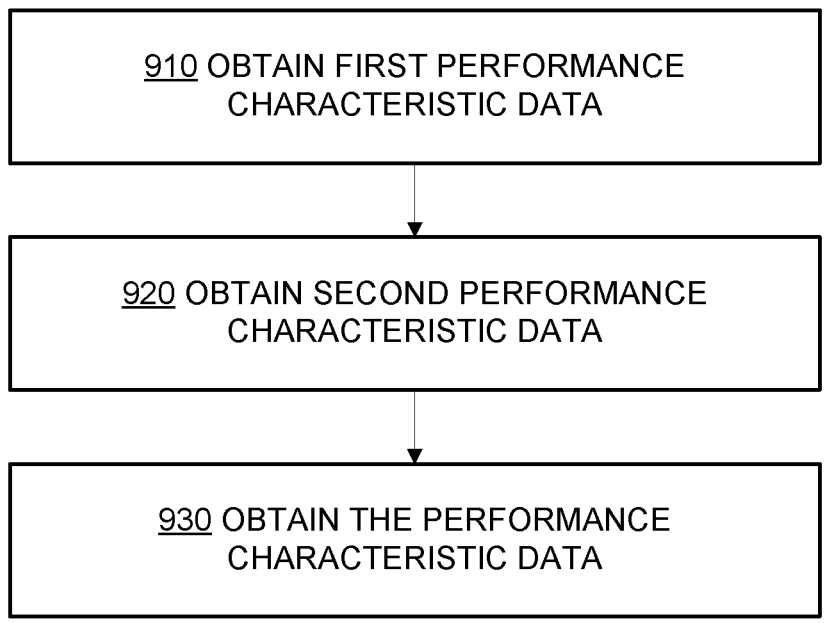
FIG. 9 depicts exemplary detailed procedures of method 600 according to some embodiments of the present disclosure.

An application to be tuned may have different performance characteristic values in different phases or periods. For example, an application related to big data can switch between disk I/O intensive and CPU intensive, that is, the application related to big data may be disk I/O intensive during the data collection phase and may be CPU intensive during the calculation phase after the data collection phase. In order to get a better identification result, this kind of phased performance characteristics should also be considered. FIG. 9 shows exemplary detailed procedures of operation 630 of FIG. 6. As shown in FIG. 9, operation 630 may include operations 910-930. At operation 910, first performance characteristic data for the application to be tuned during a first period can be obtained. At operation 920, second performance characteristic data for the application to be tuned during a second period can be obtained. At operation 930, the performance characteristic data for the application to be tuned can be obtained based on the first performance characteristic data and the second performance characteristic data. It should be noted that there may be more than two phases or periods, and the performance characteristic data during all the phases or periods can be considered. In this way, different values of performance characteristics in different periods or phases are reflected in the obtained performance characteristic data for the application to be tuned, and thus a better identification result can be obtained.

In a non-limiting example, the performance characteristic vectors for an application to be tuned can be obtained periodically for a configurable period of time, for example 100 vectors can be obtained periodically over 10 minutes (operations 910 and 920), and then the average of the 100 vectors can be calculated as the performance characteristic data (performance characteristic vector) for the application to be tuned (operation 930). The average (AV) of a number, n, performance characteristic vectors can be calculated according to equation 3 below.

$$AV = \begin{bmatrix} \frac{V_{1,1} + V_{2,1} + V_{3,1} + \ldots + V_{n,1}}{n} \\ \frac{V_{1,2} + V_{2,2} + V_{3,2} + \ldots + V_{n,2}}{n} \\ \frac{V_{1,3} + V_{2,3} + V_{3,3} + \ldots + V_{n,3}}{n} \\ \vdots \\ \frac{V_{1,m} + V_{2,m} + V_{3,m} + \ldots + V_{n,m}}{n} \end{bmatrix} \quad (3)$$

Wherein m indicates the number of performance characteristic values in every performance characteristic vector, n indicates the number of performance characteristic vectors obtained during the configurable period of time, and $V_{k,m}$ ($1 \le k \le n$) indicates the $m^{th}$ value in the $k^{th}$ performance characteristic vector.

In a further non-limiting example, the plurality of performance characteristic vectors may be given different weighing factors in calculating the average of all the plurality of performance characteristic vectors. Further, the performance characteristic vectors can also be combined by any other suitable mathematical way instead of or in addition to the average.

Referring now back to FIG. 6, at operation 640, at least one system-level tunable parameter for the application to be tuned is identified based on the pattern generated at operation 620. In some embodiments, the trained artificial neural network can be used to infer a set of system-level parameter-related correlation coefficients for the application to be tuned based on the pattern generated at operation 620 and the performance characteristic data obtained at operation 630, and the inferred set of system-level parameter-related correlation coefficients can be further used to identify the at least one system-level tunable parameter. In some embodiments, the inferred set of system-level parameter-related correlation coefficients for the application to be tuned can be further processed based on actual tuning result in the follow-up process of performance tuning. For example, 5 system-level tunable parameters are identified as the at least one system-level tunable parameter (effective system-level tunable parameters). The user can determine that 3 out of the 5 system-level tunable parameters are the actual effective system-level tunable parameters for the application to be tuned based on actual tuning result in the follow-up process of performance tuning, then correlation coefficients corresponding to the 3 system-level tunable parameters in the inferred set of system-level parameter-related correlation coefficients for the application to be tuned can be maintained while correlation coefficients corresponding to the other system-level tunable parameters can be processed to be zero, so as to obtain a processed set of system-level parameter-related correlation coefficients for the application to be tuned. The performance characteristic data and processed set of system-level parameter-related correlation coefficients for the application to be tuned can be further used as training performance characteristic data and training system-level parameter-related correlation coefficients respectively, so as to improve the generated pattern.

It is noted that the format of the set of system-level parameter-related correlation coefficients for the application to be tuned can be the same as that for the training application, as described in the above; however, the set for the application to be tuned can be inferred by the trained artificial network without calculation described in the above for the training applications. Positive correlation coefficients in the set for the application to be tuned means positive correlation between corresponding system-level tunable parameters and at least one performance metric, negative correlation coefficients in the set for the application to be tuned means negative correlation between corresponding system-level tunable parameters and the at least one performance metric, and correlation coefficients of zero means corresponding system-level tunable parameters have no influence on the at least one performance metric. An example of the set of system-level parameter-related correlation coefficients for the application to be tuned is shown below as a target correlation vector V5. In the example of target correlation vector V5, the sets of system-level parameter-related correlation coefficients for training applications can be assumed to be normalized according to equation 2 above at operation 610, then the absolute value of each value in the target correlation vector V5 can range from 0 to 1.

$$V5 = \begin{bmatrix} 1.0 \\ 0.9 \\ 0.2 \\ 0.85 \\ 0.6 \\ 0.02 \\ 0.7 \\ 0.01 \\ \vdots \\ -0.8 \end{bmatrix}$$

After the set of system-level parameter-related correlation coefficients for the application to be tuned is determined, at operation 640, at least one system-level tunable parameter for the application to be tuned can be identified based on the determined set of system-level parameter-related correlation coefficients (e.g., a target correlation vector). The number of system-level tunable parameters identified as the at least one system-level tunable parameter can be determined according to actual needs. Part or all of the system-level tunable parameters can be identified as the at least one system-level tunable parameter.

In some embodiments, operation 640 can include selecting the at least one system-level tunable parameter among the system-level tunable parameters related to the determined set of system-level parameter-related correlation coefficients by comparing each correlation coefficient within the determined set of system-level parameter-related correlation coefficients with a corresponding correlation threshold. In an example, if the sets of training system-level parameter-related correlation coefficients for training applications are normalized according to equation 2 above, then the corresponding correlation threshold can be set as one unified threshold for each of the system-level tunable parameters. In another example, if the sets of training system-level parameter-related correlation coefficients for training applications are not normalized, then the corresponding correlation threshold for each of the system-level tunable parameters can be set individually according to actual needs.

Taking correlation vector V5 as an example, correlation coefficients within the set are 1.0, 0.9, 0.2, 0.85, 0.6, 0.02, 0.7, 0.01, . . . –0.8. Then, the absolute value of each correlation coefficient can be compared with a correlation threshold $C_{thresh}$, which can be configurable or fixed. For example, assuming that $C_{thresh}$=0.7, then system-level tunable parameters corresponding to the correlation coefficients whose absolute values are larger than or equal to 0.7 will be selected as the at least one system-level tunable parameter, which can be used as at least one effective system-level tunable parameter. In this example, the selected at least one system-level tunable parameter (effective system-level tunable parameters) will be the ones corresponding to correlation coefficients of 1.0, 0.9, 0.85, 0.7 and –0.8.

In some embodiments, in the case that system-level parameter-related correlation coefficients in the set for the application to be tuned are normalized ones (the absolute value of each correlation coefficient can range from 0 to 1), system-level tunable parameters corresponding to correlation coefficients whose absolute values are the top N largest in the determined set of system-level parameter-related correlation coefficients can be selected as the at least one system-level tunable parameter, which can be used as at least one effective system-level tunable parameter, and N is an integer not larger than the total number of all system-level tunable parameters. The number N can be configurable or fixed. For example, assuming N=3, then in the example of correlation vector V5, the identified at least one system-level tunable parameter (effective system-level tunable parameters) will be the ones corresponding to the correlation coefficients of 1.0, 0.9 and 0.85. In some embodiments the number N can be a percentage, such as the top 25% of correlation coefficients, which would yield correlation coefficients of 1.0 and 0.9.

In some embodiments, the signs (positive or negative) of correlation coefficients corresponding to the identified at least one system-level tunable parameters (which can be used as at least one effective system-level tunable parameter) for the application to be tuned can be input to the follow-up process of tuning the effective system-level tunable parameters to assist the tuning, as each sign indicates whether correlation between each of the at least one system-level tunable parameter and the at least one performance metric is positive or negative. Therefore, at least one sign of at least one system-level parameter-related correlation coefficient corresponding to the identified at least one system-level tunable parameter for the application to be tuned can be identified, so as to assist tuning of the identified at least one system-level tunable parameter.

It should be noted that processing of the method 500 or method 600 for system-level tunable parameter identification described above can be implemented by computer system/server 12 or processing unit 16 of FIG. 1, or on a plurality of cloud computing nodes 10 each including computer system/server 12 or processing unit 16 as shown in FIG. 1.

It should also be noted that the terms such as "first" and "second" as used herein may indicate various elements regardless of an order and/or importance of the corresponding elements, and do not limit the corresponding elements. These terms may be used for the purpose of distinguishing one element from another element only.

Figure 10:
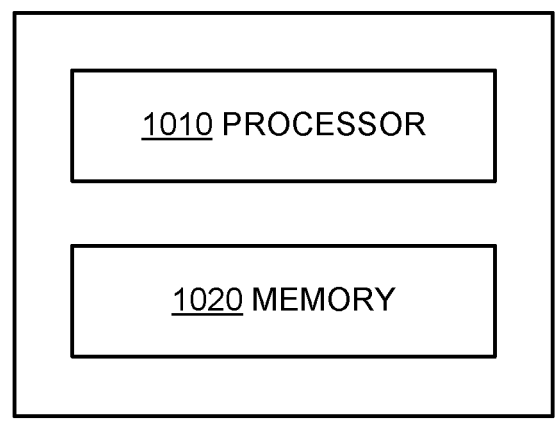
FIG. 10 depicts a system 1000 for system-level tunable parameter identification according to some embodiments of the present disclosure.

Referring now to FIG. 10, there is shown a system 1000 for system-level tunable parameter identification according to some embodiments of the present disclosure. The system 1000 for system-level tunable parameter identification comprises one or more processors 1010 and a memory 1020 coupled to at least one of the processors 1010. A set of computer program instructions are stored in the memory 1020. When executed by at least one of the processors 1010, the set of computer program instructions perform following series of actions for system-level tunable parameter identification. Performance characteristic data for an application to be tuned can be obtained. At least one system-level tunable parameter for the application to be tuned can be identified based on the obtained performance characteristic data for the application to be tuned and a pattern between training performance characteristic data and a set of training system-level parameter-related correlation coefficients. The set of training system-level parameter-related correlation coefficients can comprise respective correlation coefficients of system-level tunable parameters with respect to at least one performance metric. The identified at least one system-level tunable parameter can be used as at least one effective system-level tunable parameter.

The system 1000 in FIG. 10 can be implemented by a computer system/server 12 or processing unit 16 of FIG. 1, and can additionally include I/O interface, network adapter, etc. In addition, the system 1000 may be implemented on a plurality of cloud computing nodes 10 each including computer system/server 12 or processing unit 16 as shown in FIG. 1.

In some embodiments, the set of computer program instructions in the memory 1020 when executed by at least one of the processors further perform the following actions. Training performance characteristic data and a set of training system-level parameter-related correlation coefficients for each of at least one training application can be obtained. The pattern can be generated based on the obtained training performance characteristic data and training system-level parameter-related correlation coefficients for the at least one training application.

In some embodiments, the at least one training application can be selected based on at least one of (i) representativeness of a specific performance characteristic and (ii) cost for obtaining training performance characteristic data and training system-level parameter-related correlation coefficients for the at least one training application.

In some embodiments, the at least one training application can comprise a first training application and a second training application, the first training application is representative of a first performance characteristic, and the second training application is representative of a second performance characteristic different from the first performance characteristic.

In some embodiments, values of a system-level tunable parameter within a valid range and corresponding values of at least one performance metric of each of the at least one training application can be obtained. A training system-level parameter-related correlation coefficient related to the system-level tunable parameter for each of the at least one training application can be determined based on changing relationship between the corresponding values of the at least one performance metric and the values of the system-level tunable parameter within the valid range.

In some embodiments, one or more performance metrics can be used to determine correlation coefficients. Values of a first performance metric and values of a second performance metric corresponding to values of the system-level tunable parameter within the valid range respectively can be obtained. Weighted sums of the values of the first performance metric and the values of the second performance metric can be calculated.

In some embodiments, the pattern can be generated from a first sub-pattern and a second sub-pattern. The first sub-pattern can be generated in accordance with a first type of artificial neural network based on the at least one training application, and the second sub-pattern can be generated in accordance with a second type of artificial neural network different from the first type of artificial neural network based on the at least one training application.

In some embodiments, phased performance characteristics can be considered. First performance characteristic data for the application to be tuned during a first period and performance characteristic data for the application to be tuned during a second period can be obtained. The performance characteristic data for the application to be tuned can be obtained based on the first performance characteristic data and the second performance characteristic data.

In some embodiments, a set of system-level parameter-related correlation coefficients for the application to be tuned can be determined based on the obtained performance characteristic data for the application to be tuned and the pattern. The at least one system-level tunable parameter, which can be used as at least one effective system-level tunable parameter, can be selected among the system-level tunable parameters related to the determined set of system-level parameter-related correlation coefficients by comparing each correlation coefficient within the determined set of system-level parameter-related correlation coefficients with a corresponding correlation threshold.

In some embodiments, system-level tunable parameters corresponding to correlation coefficients whose absolute values are the top N largest can be selected from the determined set of system-level parameter-related correlation coefficients as the at least one system-level tunable parameter, which can be used as at least one effective system-level tunable parameter. N is an integer not larger than the total number of all system-level tunable parameters.

In some embodiments, at least one sign of at least one system-level parameter-related correlation coefficient corresponding to the identified at least one system-level tunable parameter for the application to be tuned can be identified.

The descriptions above related to the process of method 500 or method 600 (including the detailed procedure 700, detailed procedure 800, and detailed procedure 900 of FIGS. 7-9) can be applied to system 1000, details are omitted herein for conciseness.

According to another embodiment of the present disclosure, a computer program product for system-level tunable parameter identification is disclosed. The computer program product comprises a computer readable storage medium having program instructions embodied therewith, and the program instructions are executable by a processor. When executed, the program instructions cause the processor to perform one or more of the above described procedures.

The sequence of actions described in connection with the Figures is only exemplary and should not be construed as a limitation to the present disclosure. When necessary, the sequence of actions can be modified. In addition, one or more actions can be omitted, and more actions can be added.

It should be noted that the processing of the method for system-level tunable parameter identification (or achieved by the system for system-level tunable parameter identifying) according to embodiments of this disclosure could be implemented by computer system/server 12 or processing unit 16 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for system-level tunable parameter identification, comprising:
    obtaining, by one or more processing units, performance characteristic data for an application to be tuned; and
    identifying, by one or more processing units, at least one system-level tunable parameter for the application based on the obtained performance characteristic data for the application and a pattern between training performance characteristic data and a set of training system-level parameter-related correlation coefficients, wherein:
        the set of training system-level parameter-related correlation coefficients comprises respective correlation coefficients of system-level tunable parameters with respect to at least one performance metric, and
        the pattern is generated from a first sub-pattern and a second sub-pattern, the first sub-pattern in accordance with a first type of artificial neural network and the second sub-pattern in accordance with a second type of artificial neural network.

2. The computer-implemented method of claim 1, further comprising:
obtaining, by one or more processing units, the training performance characteristic data and the set of training system-level parameter-related correlation coefficients for each of at least one training application; and
generating, by one or more processing units, the pattern further based on the obtained training performance characteristic data and training system-level parameter-related correlation coefficients for the at least one training application.

3. The computer-implemented method of claim 2, wherein the at least one training application is selected based on at least one of the group consisting of (i) representativeness of a specific performance characteristic and (ii) cost for obtaining training performance characteristic data and training system-level parameter-related correlation coefficients for the at least one training application.

4. The computer-implemented method of claim 2, wherein the at least one training application comprises a first training application and a second training application, the first training application is representative of a first performance characteristic, and the second training application is representative of a second performance characteristic different from the first performance characteristic.

5. The computer-implemented method of claim 2, wherein the obtaining the set of training system-level parameter-related correlation coefficients for each of at least one training application comprises:
obtaining, by one or more processing units, values of a system-level tunable parameter within a valid range and corresponding values of at least one performance metric of each of the at least one training application; and
determining, by one or more processing units, a training system-level parameter-related correlation coefficient related to the system-level tunable parameter for each of the at least one training application based on a changing relationship between the corresponding values of the at least one performance metric and the values of the system-level tunable parameter within the valid range.

6. The computer-implemented method of claim 5, wherein the obtaining corresponding values of at least one performance metric of each of the at least one training application comprises:
obtaining, by one or more processing units, values of a first performance metric and values of a second performance metric corresponding to the values of the system-level tunable parameter within the valid range; and
calculating, by one or more processing units, weighted sums of the values of the first performance metric and the values of the second performance metric.

7. The computer-implemented method of claim 2, wherein:
the first sub-pattern is generated based on the at least one training application; and
the second sub-pattern is generated based on the at least one training application.

8. The computer-implemented method of claim 1, wherein the obtaining performance characteristic data for the application comprises:
obtaining, by one or more processing units, first performance characteristic data for the application during a first period;
obtaining, by one or more processing units, second performance characteristic data for the application during a second period; and
obtaining, by one or more processing units, the performance characteristic data for the application based on the first performance characteristic data and the second performance characteristic data.

9. The computer-implemented method of claim 1, wherein the identifying at least one system-level tunable parameter for the application comprises:
determining, by one or more processing units, a set of system-level parameter-related correlation coefficients for the application based on the obtained performance characteristic data for the application and the pattern; and
selecting, by one or more processing units, the at least one system-level tunable parameter among the system-level tunable parameters related to the determined set of system-level parameter-related correlation coefficients by comparing each correlation coefficient within the determined set of system-level parameter-related correlation coefficients with a corresponding correlation threshold.

10. The computer-implemented method of claim 1, further comprising:
identifying, by one or more processing units, at least one sign of at least one system-level parameter-related correlation coefficient corresponding to the identified at least one system-level tunable parameter for the application.

11. A system for system-level tunable parameter identification, comprising:
one or more processors;
a memory coupled to at least one of the processors;
a set of computer program instructions stored in the memory, which, when executed by at least one of the processors, perform actions of:
obtaining performance characteristic data for an application to be tuned; and
identifying at least one system-level tunable parameter for the application based on the obtained performance characteristic data for the application and a pattern between training performance characteristic data and a set of training system-level parameter-related correlation coefficients, wherein:
the set of training system-level parameter-related correlation coefficients comprises respective correlation coefficients of system-level tunable parameters with respect to at least one performance metric, and
the pattern is generated from a first sub-pattern and a second sub-pattern, the first sub-pattern in accordance with a first type of artificial neural network and the second sub-pattern in accordance with a second type of artificial neural network.

12. The system of claim 11, wherein the set of computer program instructions when executed by at least one of the processors further perform actions of:
obtaining the training performance characteristic data and the set of training system-level parameter-related correlation coefficients for each of at least one training application; and
generating the pattern further based on the obtained training performance characteristic data and training system-level parameter-related correlation coefficients for the at least one training application.

13. The system of claim 12, wherein the at least one training application is selected based on at least one of the group consisting of (i) representativeness of a specific performance characteristic and (ii) cost for obtaining training performance characteristic data and training system-level parameter-related correlation coefficients for the at least one training application.

14. The system of claim 12, wherein the at least one training application comprises a first training application and a second training application, the first training application is representative of a first performance characteristic, and the second training application is representative of a second performance characteristic different from the first performance characteristic.

15. The system of claim 12, wherein the obtaining a set of training system-level parameter-related correlation coefficients for each of at least one training application comprises:
   obtaining values of a system-level tunable parameter within a valid range and corresponding values of at least one performance metric of each of the at least one training application; and
   determining a training system-level parameter-related correlation coefficient related to the system-level tunable parameter for each of the at least one training application based on a changing relationship between the corresponding values of the at least one performance metric and the values of the system-level tunable parameter within the valid range.

16. The system of claim 15, wherein the obtaining corresponding values of at least one performance metric of each of the at least one training application comprises:
   obtaining values of a first performance metric and values of a second performance metric corresponding to the values of the system-level tunable parameter within the valid range; and
   calculating weighted sums of the values of the first performance metric and the values of the second performance metric.

17. The system of claim 12, wherein:
   the first sub-pattern is generated based on the at least one training application; and
   the second sub-pattern is generated based on the at least one training application.

18. The system of claim 11, wherein the obtaining performance characteristic data for the application comprises:
   obtaining first performance characteristic data for the application during a first period;
   obtaining second performance characteristic data for the application during a second period; and
   obtaining the performance characteristic data for the application based on the first performance characteristic data and the second performance characteristic data.

19. The system of claim 11, wherein the identifying at least one system-level tunable parameter for the application comprises:
   determining, by one or more processing units, a set of system-level parameter-related correlation coefficients for the application based on the obtained performance characteristic data for the application and the pattern; and
   selecting the at least one system-level tunable parameter among the system-level tunable parameters related to the determined set of system-level parameter-related correlation coefficients by comparing each correlation coefficient within the determined set of system-level parameter-related correlation coefficients with a corresponding correlation threshold.

20. A computer program product for system-level tunable parameter identification, the computer program product comprising a computer readable storage medium having program instructions embodied therewith, the program instructions executable by a processor to cause the processor to:
   obtain performance characteristic data for an application to be tuned; and
   identify at least one system-level tunable parameter for the application based on the obtained performance characteristic data for the application and a pattern between training performance characteristic data and a set of training system-level parameter-related correlation coefficients, wherein:
   the set of training system-level parameter-related correlation coefficients comprises respective correlation coefficients of system-level tunable parameters with respect to at least one performance metric, and
   the pattern is generated from a first sub-pattern and a second sub-pattern, the first sub-pattern in accordance with a first type of artificial neural network and the second sub-pattern in accordance with a second type of artificial neural network.

* * * * *